US010025733B2

(12) United States Patent
Zhu

(10) Patent No.: US 10,025,733 B2
(45) Date of Patent: Jul. 17, 2018

(54) DATA OUTPUT DISPATCHING DEVICE AND METHOD

(71) Applicant: Realtek Semiconductor Corporation, Hsinchu (TW)

(72) Inventor: Jian-Yin Zhu, Jiangsu Province (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 58 days.

(21) Appl. No.: 15/265,450

(22) Filed: Sep. 14, 2016

(65) Prior Publication Data
US 2017/0109303 A1  Apr. 20, 2017

(30) Foreign Application Priority Data

Oct. 14, 2015  (CN) .......................... 2015 1 0662968

(51) Int. Cl.
*G06F 13/22* (2006.01)
*G06F 5/01* (2006.01)
*G06F 13/16* (2006.01)
*G06F 13/37* (2006.01)

(52) U.S. Cl.
CPC ............... *G06F 13/22* (2013.01); *G06F 5/015* (2013.01); *G06F 13/1673* (2013.01); *G06F 13/37* (2013.01)

(58) Field of Classification Search
CPC .......... G06F 5/015; G06F 13/22; G06F 13/37; G06F 13/1673
See application file for complete search history.

(56) References Cited

U.S. PATENT DOCUMENTS

| 2001/0048690 A1* | 12/2001 | Magill | ................ H04L 12/5601 370/415 |
| 2008/0313684 A1* | 12/2008 | Batalden | .......... H04N 21/26216 725/97 |
| 2010/0115227 A1* | 5/2010 | Mansour | ............. H03M 13/276 711/202 |

OTHER PUBLICATIONS

Zhang, Xue et al., A new WRR algorithm based on ideal packet interval time, 2011 Fourth International Conference on Intelligent Computation Technology and Automation, pp. 1039-1042.
Matsufuru, Norio et al., Efficient Fair Queueing for ATM Networks using Uniform Round Robin, IEEE, 1999.

* cited by examiner

*Primary Examiner* — Glenn A Auve
(74) *Attorney, Agent, or Firm* — WPAT, PC

(57) ABSTRACT

The present invention discloses a data output dispatching device and method capable of reducing the probability of packets from the same queue being transmitted sequentially. An embodiment of the method comprises the following steps: providing a plurality of buffers capable of storing the data of Q queues respectively while each queue is associated with a weighting and the sum Ws of all the weightings is between $2^{(M-1)}$ and $2^M$ and not greater than a maximum sum in which Q is an integer greater than 1, M is a positive integer and N is an integer not less than M; providing a binary bit reverse count value not greater than $2^N$; and assigning a token to one of the Q queues for data output according to the reverse count value.

20 Claims, 17 Drawing Sheets

| decimal value | 0 | 1 | 2 | ------------------- | 29 | 30 | 31 |
|---|---|---|---|---|---|---|---|
| binary value | 00000 | 00001 | 00010 | ------------------- | 11101 | 11110 | 11111 |

↓ reverse

| binary value | 00000 | 10000 | 01000 | ------------------- | 10111 | 01111 | 11111 |
|---|---|---|---|---|---|---|---|
| decimal value | 0 | 16 | 8 | ------------------- | 23 | 15 | 31 |

Fig. 3

| 0000000000 | 0000100000 | ------------ | 1111000000 | 1111100000 |
| 0000011111 | 0000111111 |              | 1111011111 | 1111111111 |

↓ reverse

| ?????00000 | ?????10000 | ------------ | ?????01111 | ?????11111 |

Fig. 8

DATA OUTPUT DISPATCHING DEVICE AND METHOD

BACKGROUND OF THE INVENTION

1. Field of the Invention

The present disclosure relates to a data output dispatching device and method, especially to a data output dispatching device and method capable of reducing a probability that packets from the same queue are transmitted sequentially.

2. Description of Related Art

A data output dispatching algorithm is often introduced into a communication product (e.g., a network communication product) to determine the output order of data in a plurality of queues. The weighted round robin (WRR) algorithm is a common algorithm for dispatching data, and capable of dispatching data from a plurality of queues for output according to weightings of these queues. For example, if the queues are queues Q0, Q1, Q2 and Q3, the data of the queues Q0, Q1, Q2 and Q3 are labeled with a, b, c and d respectively for understanding and the weightings of the queues Q0, Q1, Q2 and Q3 are 1, 1, 2 and 4 respectively, the outputted data from these queues as shown in FIG. 1 will be . . . a-b-cc-dddd-a-b-cc-dddd-a-b . . . in turn provided that the data of each queue are sufficient for output, in which the data of queues Q0, Q1, Q2 and Q3 come from a preceding device (which could be a terminal instead) 110 and are stored in buffers 122, 124, 126 and 128 of a current device 120 to be outputted to a next device (which could be a terminal instead) 130. The advantage of the WRR algorithm is easy to be implemented, while the disadvantage of the WRR algorithm includes the problem of data burst due to uneven weighting allocation, the problem of unstable output of a single queue, etc. Taking FIG. 1 for example, the queue Q3 in the buffer 128 is allowed to transmit four consecutive units of data (i.e., dddd) which effect the peak of data output, and then the queues Q0, Q1 and Q2 in the buffers 122, 124 and 126 are allowed to transmit four units of data (i.e., a-b-cc) which effect the valley of data output. If the weighting of the queue Q3 is higher or the data amount of each of the consecutive units of data is big, the problem of unstable data output will be more serious.

SUMMARY OF THE INVENTION

An object of the present disclosure is to provide a data output dispatching device and method for the improvement over the prior art.

The present disclosure discloses a data output dispatching device configured to reduce a probability that packets from the same queue are transmitted sequentially. An embodiment of the data output dispatching device comprises: Q buffers configured to store data of Q queues respectively while the Q queues are associated with Q weightings respectively and each of the Q weightings is not greater than a maximum weighting which is equal to or less than $2^N$, in which the Q is an integer greater than one and the N is a positive integer; a weighting allocator configured to allocate the Q weightings according to a binary bit reverse sequence so as to distribute a $K^{th}$ weighting among the Q weightings and make the $K^{th}$ weighting be logically associated with T queue point(s) of $2^N$ queue points, in which the K is a positive integer not greater than the Q, the T is an integer not less than zero and not greater than the maximum weighting, the value of the $K^{th}$ weighting is the T, and the order of the $2^N$ queue points is in incremental order; and a polling circuit configured to poll the Q buffers according to at least a part of the order of the $2^N$ queue points, and when the polling circuit polls the Q buffers during a current polling cycle, the polling circuit allows a buffer of the Q buffers in association with the $K^{th}$ weighting to obtain a token for data output if the current polling cycle is logically associated with one of the T queue point(s) of the $2^N$ queue points.

The present disclosure also discloses a data output dispatching method configured to reduce a probability that packets from the same queue are transmitted sequentially. An embodiment of the data output dispatching method comprises the following steps: providing a plurality of buffers configured to store data of Q queues respectively while each of the Q queues is associated with a weighting and the sum Ws of the Q weightings is between $2^{(M-1)}$ and $2^M$ and not greater than a maximum sum which is not greater $2^N$, in which the Q is an integer greater than one, the M is a positive integer, and the N is an integer not less than the M; generating a binary bit reverse count value not greater than $2^N$; and assigning a token to one of the Q queues for data output according to the binary bit reverse count value.

The present disclosure further discloses a data output dispatching device configured to reduce a probability that packets from the same queue are transmitted sequentially. An embodiment of the data output dispatching device comprises: a plurality of buffers configured to store data of Q queues respectively while each of the Q queues is associated with a weighting, in which the Q is an integer greater than one; a binary bit reverse sequence generating circuit configured to provide a binary bit reverse sequence; and a control circuit configured to assign a token to one of the Q queues for data output according to the binary bit reverse sequence.

These and other objectives of the present invention will no doubt become obvious to those of ordinary skill in the art after reading the following detailed description of the exemplary embodiments that are illustrated in the various figures and drawings.

BRIEF DESCRIPTION OF THE DRAWINGS

FIG. 3 shows the comparison between a binary bit count value and a reverse binary bit count value.

FIG. 8 illustrates how a reverse count value is divided into a plurality of regions to be applicable to FIG. 7.

DETAILED DESCRIPTION OF THE PREFERRED EMBODIMENTS

The following description is written by referring to terms acknowledged in this invention field. If any term is defined in this specification, such term should be explained accordingly.

The present invention includes a data output dispatching device and method capable of reducing a probability that data (e.g., packets) from the same queue are transmitted sequentially. On account of that some element of the dispatching device could be known, the detail of such element will be omitted provided that the present disclosure is still in compliance with the written description and enablement requirements. In addition, the dispatching method can be in the form of firmware and/or software which could be carried out by the dispatching device of the present invention or the equivalent thereof. It should be noted that if an implementation derived from one or more of the embodiments in the following description is practicable, a person of ordinary skill in the art can selectively make use of some or all of the features in one embodiment or selectively make use of the combination of some or all features in several embodiments to have the implementation come true, so as to increase the flexibility of carrying out the present invention.

Figure 1:
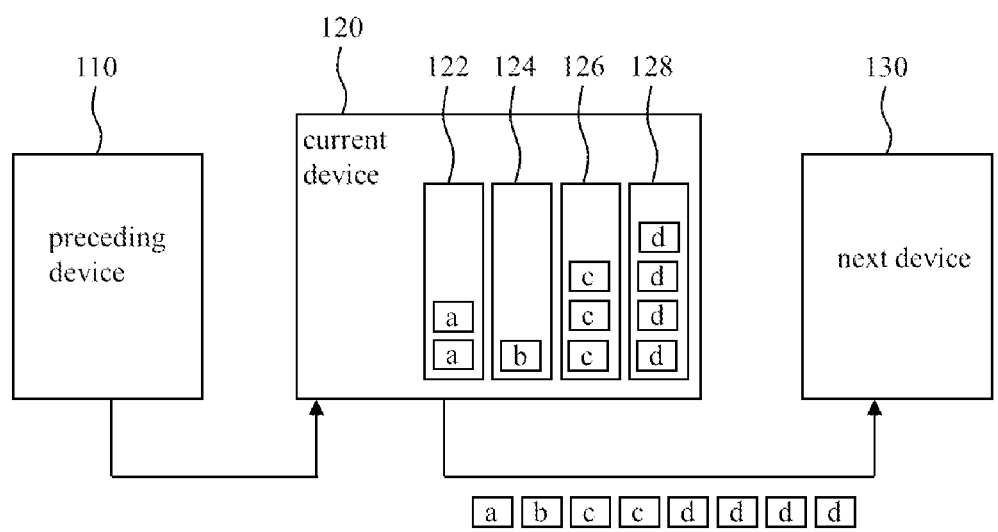
FIG. 1 illustrates an embodiment of the weighted round robin algorithm according to the prior art.
Figure 2:
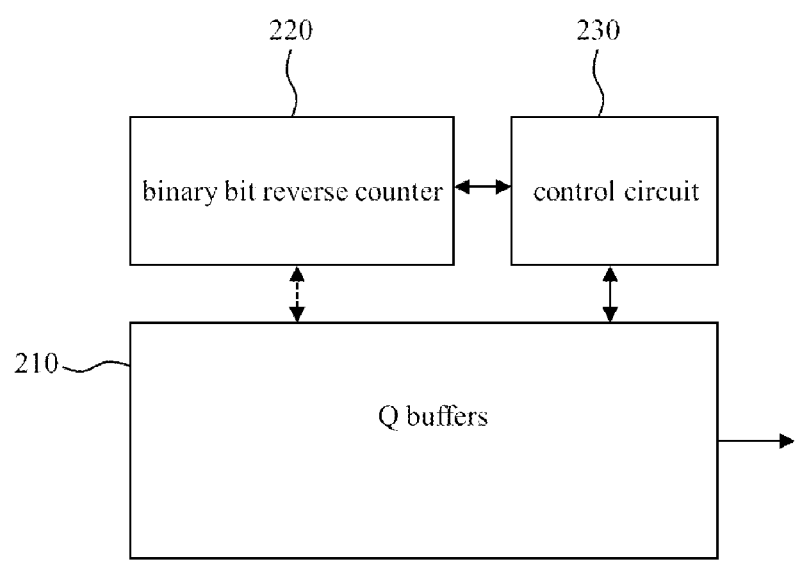
FIG. 2 illustrates an embodiment of the data output dispatching device of the present invention.

Please refer to FIG. 2 which illustrates an embodiment of the data output dispatching device of the present invention. A dashed line in FIG. 2 indicates a path that may be necessary or negligible in accordance with the requirement of implementation, and a double-headed arrow in FIG. 2 can be replaced by a single-headed arrow under the requirement of implementation. The data output dispatching device 200 of this embodiment could be a network communication device (e.g., a switch, a router, etc.) or a device having need to arrange data output. The device 200 includes: Q buffers 210; a binary bit reverse counter 220; and a control circuit 230. The Q buffers 210 store data of Q queues respectively (i.e., one of the Q buffers 210 stores data of one of the Q queues), each of the Q queues is associated with a weighting, the sum of the Q weightings is Ws, and the sum Ws is between $2^{(M-1)}$ and $2^M$ and not greater than a maximum Wmax which is not greater than $2^N$, in which the Q is an integer greater than one, the M is a positive integer and the N is a positive integer not less than the M. The binary bit reverse counter 220 is operable to generate a reverse count value which is not greater than $2^N$. The control circuit 230 assigns a token to one of the Q buffers 210 for data output according to the reverse count value.

In an exemplary implementation, the device 200 includes eight buffers 210 for storing data of eight queues Q0, Q1, Q2, Q3, Q4, Q5, Q6 and Q7 respectively. The weightings of the eight queues are W0, W1, W2, W3, W4, W5, W6 and W7 respectively, and the sum of all the weightings is not greater than a maximum sum Wmax which is not greater than $2^{10}$ (i.e., the aforementioned variable N here is 10, and the binary bit reverse counter 220 is a 10-bit reverse counter). In light of the eight weightings, the exemplary implementation defines eight regions as follows:

Region 0: a region from 0 to Ws0, in which Ws0=W0 while this region includes 0 but excludes W0;

Region 1: a region from Ws0 to Ws1, in which Ws1=Ws0+W1 while this region includes Ws0 but excludes W1;

Region 2: a region from Ws1 to Ws2, in which Ws2=Ws1+W2 while this region includes Ws1 but excludes Ws2;

Region 3: a region from Ws2 to Ws3, in which Ws3=Ws2+W3 while this region includes Ws2 but excludes Ws3;

Region 4: a region from Ws3 to Ws4, in which Ws4=Ws3+W4 while this region includes Ws3 but excludes Ws4;

Region 5: a region from Ws4 to Ws5, in which Ws5=Ws4+W5 while this region includes Ws4 but excludes Ws5;

Region 6: a region from Ws5 to Ws6, in which Ws6=Ws5+W6 while this region includes Ws5 but excludes Ws6; and Region 7: a region from Ws6 to Ws7, in which Ws7=Ws6+W7 while this region includes Ws6 but excludes Ws7.

Therefore, the control circuit 230 is operable to assign a token to the buffer 210 storing data of the queue QI when the reverse count value of the reverse counter 220 falls within the region I, in which the variable I is an integer among zero to seven. It should be noted that one of ordinary skill in the art may modify the above-described regions (i.e., Region 0 to Region 7) according to the present disclosure in view of her/his demand.

In comparison with a count value that is not reversed, the reverse count value outputted by the binary bit reverse counter 220 is out of order. Accordingly, assigning a token based on the reverse count value can reduce the probability of packets from the same queue being transmitted sequentially. In detail, as shown in FIG. 3, successive 5-bit binary count values are 0000, 00001, 00010, . . . , 11101, 11110 and 11111 which are equivalent to 0, 1, 2, . . . , 29, 30 and 31 of a decimal system. On the other hand, successive 5-bit binary bit reverse count values are 00000, 10000, 01000, . . . , 10111, 01111 and 11111 which are equivalent to 0, 16, 8, . . . , 23, 15 and 31 of a decimal system. Through the analysis of an N-bit (e.g., N=5in FIG. 3) binary bit reverse count value sequence, the following features can be found:

(1) A count value less than $2^{(N-1)}$ is always in an odd position, while a count value greater than or equal to $2^{(N-1)}$ is in an even position;

(2) Based on the feature of (1), count values from 0 to $[2^{(N-1)}-1]$ (e.g., from 0 to 15 in FIG. 3) are uniformly distributed over $2^{(N-1)}$ regions;

(3) Regarding the $2^{(N-1)}$ regions of (2), each region includes two count values and the difference between them is $2^{(N-1)}$; and (4) Based on the features of (2) and (3), among count values from 0 to $[2^N-1]$ (e.g., from 0 to 31 in FIG. 3), $2^{(N-1)}$ successive $2^{(N-1)}$ count values are distributed over $2^{(N-1)}$ regions. In other words, $2^M$ successive count values are distributed over $2^M$ regions.

Accordingly, with the features mentioned above, it is possible to make use of a reverse count value to reduce the probability of packets from the same queue being transmitted sequentially.

Figure 4:
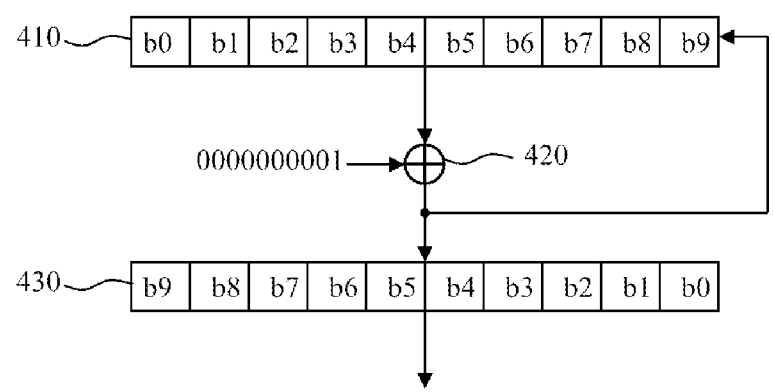
FIG. 4 illustrates an embodiment of the binary bit reverse counter of FIG. 2.

Please refer to FIG. 4 which illustrates an embodiment of the binary bit reverse counter 220. The variable N in this embodiment is ten; however, N could be a value other than ten as long as such value of N is applicable. As it is shown in FIG. 4, the counter 220 includes: a first N-bit buffer 410 configured to store an N-bit counting value according to an addition value and forward storage order (i.e., the order from $0^{th}$ bit (which is labeled as b0 in the figure) to $9^{th}$ bit (which is labeled as b9 in the figure) and then output the N-bit counting value; an adder 420 coupled to the first N-bit buffer 410 and configured to add up the N-bit counting value and N-bit one (i.e., 0000000001 in this embodiment) to generate the addition value; and a second N-bit buffer 430 configured to store the addition value according to reverse storage order (i.e., the order from $9^{th}$ bit to $0^{th}$ bit) and then output the addition value as the aforementioned binary bit reverse count value. For instance, if the first N-bit buffer 410 outputs a counting value 0000000000 at first, the adder 420 adds up the counting value 0000000000 and a value 0000000001 to generate an addition value 0000000001; afterwards, the second N-bit buffer 430 stores the addition value 0000000001 according to reverse storage order to obtain and output a reverse count value 1000000000, while the first N-bit buffer 410 stores the addition value 0000000001 to output an updated N-bit counting value 0000000001 to replace the original N-bit counting value 0000000000; and so on and so forth. In the embodiment of FIG. 4, the sum of weightings Ws is constant and equal to the maximum sum Wmax which could be $2^N$, so as to ensure that the reverse count value definitely falls within a region (e.g., one of the aforementioned regions, i.e., Region 1 to Region 7) in association with a queue.

Figure 5:
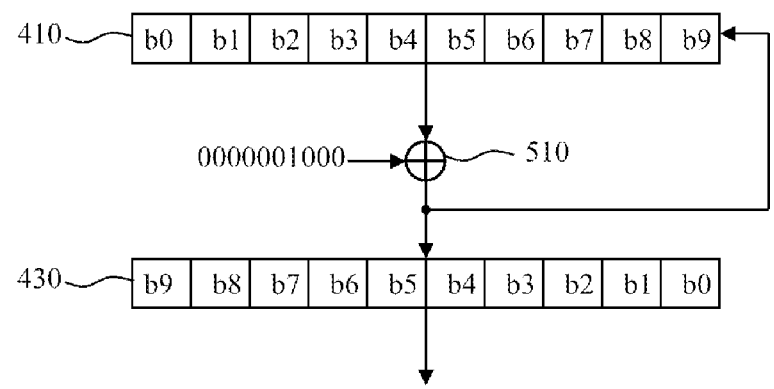
FIG. 5 illustrates another embodiment of the binary bit reverse counter of FIG. 2.

As it is described in the preceding paragraphs, the maximum sum Wmax of weightings of all queues is not greater than $2^N$, and therefore an N-bit binary bit reverse counter 220 is enough for dispatching data of all queues for output. However, if the sum Ws of weightings of all queues is between $2^{(M-1)}$ and $2^M$ (that is to say the sum Ws of weightings not less than $2^{(M-1)}$ but less than $2^M$ while the M is less than the N, providing that the reverse count value of the reverse counter 220 falls within the region between Ws and $2^N$ (i.e., the region including Ws but excluding $2^N$), since no queue is associated with this region, no queue can gain a token for data output, which wastes the time on trying to dispatch data. In consideration of the above-described problem, the present disclosure discloses another embodiment of the binary bit reverse counter 220 as shown in FIG. 5. In comparison with the reverse counter 220 of FIG. 4, a first adder 510 of FIG. 5 is configured to add up the counting value of the first N-bit buffer 410 and a first shift number (instead of one) to generate the addition value, so as to prevent the second N-bit buffer 430 from outputting an addition value greater than $2^M$. It should be noted that the first shift number is related to the value of (N–M). For instance, when the reverse counter 220 is a 10-bit counter (i.e., N=10) and the sum Ws of weightings is between $2^6$ and $2^7$ (i.e., M=7), the first shift number is 0000001000, which can be obtained through shifting 0000000001 left by (N–M) bits and filling the vacant bit positions on the right side with zero after the shift operation. As a result, the first adder 510 sequentially generates the addition values 0000001000, 0000010000, 0000011000, etc., and the first three bits of the reverse count value from the second N-bit buffer 430 are kept being zero, which leads to a result of passing/omitting each reverse count value greater than $2^7$ and accelerating the operation of dispatching data.

Figure 6:
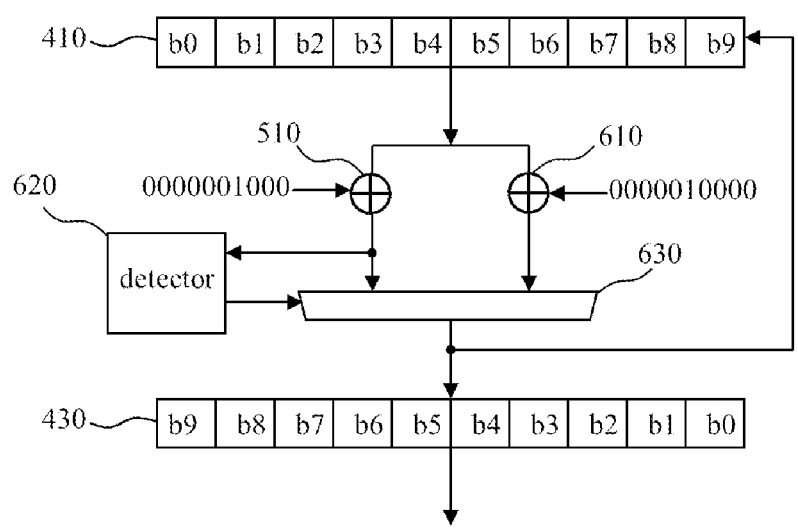
FIG. 6 illustrates a further embodiment of the binary bit reverse counter of FIG. 2.

Another embodiment of the binary bit reverse counter 220 is shown in FIG. 6. In comparison with FIG. 5, the reverse counter 220 of FIG. 6 further includes: a second adder 610 coupled to the first N-bit buffer 410 and configured to add up the counting value and a second shift number to generate a second addition value, in which the second shift number is greater than the aforementioned first shift number; a detector 620 coupled to the first adder 510 and configured to detect whether the bit reverse value of the first addition value (i.e., the addition value generated by the first adder 510) is less than the sum Ws and thereby generate a detection result; and a selector 630 coupled to the detector 620 and configured to output one of the first and second addition values as the addition value. Accordingly, the second N-bit buffer 430 is operable to output this addition value as the reverse count value which is not greater than the sum Ws. For instance, providing that the reverse counter 220 is a 10-bit counter (i.e., N=10) and the sum Ws of weightings is 120 (i.e., 0001111000 of a binary system) between $2^6$ and $2^7$ (i.e., M=7), the second shift number could be 0000010000 (i.e., a number obtained through shifting 0000000010 left by (N–M) bits and filling the vacant bit positions on the right side with zero after the shift operation). Hence, if the detector 620 finds that the bit reverse value 0001111001 of the first addition value 1001111000 obtained by adding up the counting value (e.g., 1001110000) and the first shift number 0000001000 is greater than the sum Ws (i.e., 0001111000), the selector 630 is operable to output the second addition value 1010000000 according to the detection result, in which the second addition value is obtained by adding up the counting value (e.g., 1001110000) and the second shift number 0000010000. As a result, the reverse count value 0000000101 outputted by the second N-bit buffer 430 is less than the sum Ws (i.e., 0001111000), which implies that a counting value greater than the sum Ws will be omitted for the acceleration of dispatching data.

In consideration of that there might be no data left in some queue for output when executing the operation of dispatching data, if the data output dispatching device 200 still assigns a token to such queue, it will be a waste of time. Thus, the present disclosure discloses a binary bit reverse counter 700 in FIG. 7 for dealing with the above-mentioned problem. The counter 700 is operable to divide the overall region including all reverse count values, e.g., values from the reverse count value 0 to the reverse count value 1023 as shown in FIG. 8, into a plurality of subsidiary regions, e.g., 32 subsidiary regions. More specifically, 32 non-reverse count values from 0000000000 to 0000011111 are reversed to constitute a reverse count value sequence ?????00000 which is the first subsidiary region, in which the symbol "?" could be 0 or 1. Similarly, the other 31 subsidiary regions are the region of the sequence ?????10000, the region of the sequence ?????01000, the region of the sequence ?????11000, . . . , the region of the sequence ?????01111 and the region of the sequence ?????11111 respectively. Afterwards, the counter 700 is operable to determine whether a subsidiary region includes a reverse count value in association with a queue and whether this queue is spare (i.e., having no data left for output) and thereby decide to pass this subsidiary region (i.e., to pass/omit the count values in this subsidiary region) and go to the next subsidiary region immediately.

Figure 7:
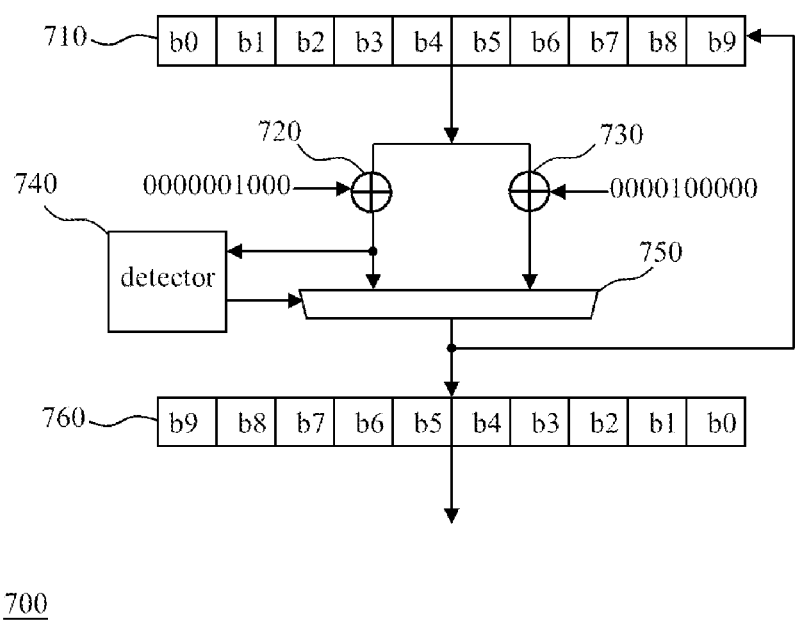
FIG. 7 illustrates a further embodiment of the binary bit reverse counter of FIG. 2.

As it is shown in FIG. 7, the counter 700 includes: a first N-bit buffer 710 configured to store a counting value according to an addition value and forward storage order; a first adder 720 coupled to the first N-bit buffer 710 and configured to add up the addition value and a first shift number to generate a first addition value; a second adder 730 coupled to the first N-bit buffer 710 and configured to add up the counting value and a second shift number (e.g., a constant number) to generate a second addition value; a detector 740 configured to generate a detection result according to a predetermined condition; a selector 750 coupled to the detector 740 and configured to output one of the first and second addition values as the addition value according to the detection result; and a second N-bit buffer 760 configured to store the addition value according to reverse storage order and output the addition value as the reverse count value which is not greater than $2^M$. Referring to FIG. 8, provided that N=10 and the overall region is divided into 32 subsidiary regions, the second shift number in the embodiment of FIG. 7 could be 0000100000 (i.e., 32 of a decimal system), so as to omit 32 count values when reaching the said predetermined condition (e.g., the said predetermined condition is not satisfied). As a result a subsidiary region having no need for data output will be passed/omitted, while each subsidiary region includes 32 values. In addition, an embodiment of the said predetermined condition includes the following scenarios:

(1) the sum Ws of weightings not greater than 32, which means that when the sum Ws is less than 32, there is no need to output the second addition value because the second addition value is used for passing/omitting 32 values and useless if Ws is not greater than 32;

(2) the value of the least significant five bits of the counting value from the first N-bit buffer 710 not equal to zero, which means that if the value of the least significant five bits is not equal to zero, the operation of dispatching data has been initiated for the current subsidiary region and should run over the 32 values in this subsidiary region, and if the value of the least significant five bits is equal to zero, the state of the operation of dispatching data is at the boundary of the subsidiary region which could be omitted under such state; and (3) a queue found to be not spare while the current subsidiary region includes a reverse count value in association with such queue, which implies that the current subsidiary region is associated with at least a token of at least a queue.

If any of the above-mentioned scenarios is held true, the detector 740 will find that the current subsidiary region cannot be passed/omitted and have the selector 750 output the first addition value; on the contrary, if none of the scenarios is held true, the detector 740 will have the selector 750 output the second addition value.

In the embodiment of the aforementioned predetermined condition, in view of the features of a bit reverse count sequence, if the weighting Wj of a queue Qj is not less than 32, each subsidiary region in FIG. 8 will definitely include at least one reverse count value associated with the queue Qj; therefore, if there are data left in the queue Qj for output, the data will be outputted in 32 output cycles. However, if the weighting Wj of the queue Qj is less than 32, some subsidiary region will include no reverse count value associated with the queue Qj; in this scenario, the present embodiment will detect whether a subsidiary region includes a reverse count value associated with the queue Qj, and pass the subsidiary region if no reverse count value is included therein. For instance, assuming that the number of queues is eight and the regions of the eight queues are the aforementioned regions (i.e., Region 1 to Region 7) respectively, the way to detect whether a subsidiary region includes a reverse count value associated with a queue Qj can be realized through the following rules:

(1) If the queue Qj is the queue Q0, when the following equation 1 is held true, the subsidiary region under detection includes a reverse count value associated with the queue Q0:

$$0<=cnt\_rev[4:0]<Ws0[4:0], \quad (eq. 1)$$

in which cnt_rev[4:0] is the value of the least significant five bits of the reverse count value.

For instance, provided that Ws0=W0 (i.e., the weighting of the queue Q0)=17 of a decimal system=0000010001 of a binary system, Ws0[4:0]=10001 is found; therefore, a subsidiary region capable of fulfilling equation 1 (i.e., 0<=cnt_rev[4:0]<Ws0[4:0]=10001) is the subsidiary region including a reverse count value associated with the queue Q0, that is to say each one of the $1^{st}$, $2^{nd}$, $3^{rd}$, $5^{th}$, $7^{th}$, $9^{th}$, $11^{th}$, $13^{th}$, $15^{th}$, $17^{th}$, $19^{th}$, $21^{st}$, $23^{rd}$, $25^{th}$, $27^{th}$, $29^{th}$ and $31^{st}$ subsidiary regions in FIG. 8 (while cnt_rev[4:0] of these seventeen subsidiary regions are 00000, 10000, 01000, . . . , and 01111 respectively).

(2) If the queue Qj is one of the queues Q1, Q2, . . . , and Q7 (i.e., j=1, 2, 3, 4, 5, 6, 7), when the following equation 2 or equation 3 is held true, the subsidiary region under detection includes a reverse count value associated with the queue Qj:

provided that Wsi[4:0]<=Wsj[4:0] is held true while i=(j−1), $$Wsi[4:0]<=cnt\_rev[4:0]<Wsj[4:0], \quad (eq. 2)$$

and provided that Wsi[4:0]<=Wsj[4:0] is not held true, $$Wsi[4:0]<=cnt\_rev[4:0] \text{ or } cnt\_rev[4:0]<Wsj[4:0] \quad (eq. 3).$$

For instance, provided that Wi=W0=17, Wj=W1=8, Wsi=Ws0=W0=17 of a decimal system=0000010001 of a binary system, and Wsj=Ws1=W0+W1=25 of a decimal system=0000011001 of a binary system, Wsi[4:0]=10001 and Wsj[4:0]=11001 are found, which indicates that Wsi[4:0]<=Wsj[4:0] is held true.

Therefore, a subsidiary region capable of fulfilling equation 2 (i.e., Wsi[4:0]=10001<=cnt_rev[4:0]<Wsj[4:0]=11001) is the subsidiary region includes a reverse count value associated with the queue Qj, that is to say each one of the $4^{th}$, $6^{th}$, $10^{th}$, $14^{th}$, $18^{th}$, $22^{nd}$, $26^{th}$, and $30^{th}$ subsidiary regions in FIG. 8 (while cnt_rev[4:0] of these eight subsidiary regions are 11000, 10100, 10010, . . . , and 10111 respectively).

For another instance, provided that Wi=W0=17, Wj=W1=17, Wsi=Ws0=W0=17 of a decimal system=0000010001 of a binary system, and Wsj=Ws1=W0+W1=34 of a decimal system=0000100010 of a binary system, Wsi[4:0]=10001 and Wsj[4:0]=00010 are found, which indicates that Wsi[4:0]<=Wsj[4:0] is not held true. Therefore, a subsidiary region capable of fulfilling equation 3 (i.e., Wsi[4:0]=10001<=cnt_rev[4:0] or cnt_rev[4:0]<Wsj[4:0]=00010) is the subsidiary region includes a reverse count value associated with the queue Qj, that is to say each one of the $1^{st}$, $4^{th}$, $6^{th}$, $8^{th}$, $10^{th}$, $12^{th}$, $14^{th}$, $16^{th}$, $17^{th}$, $18^{th}$, $20^{th}$, $22^{nd}$, $24^{th}$, $26^{th}$, $28^{th}$, $30^{th}$ and $32^{nd}$ subsidiary regions in FIG. 8 (while cnt_rev[4:0] of these seventeen subsidiary regions are 00000, 11000, 10100, . . . , and 11111 respectively).

It should be noted that the aforementioned equations (i.e., eq. 1 to eq. 3) should be modified in accordance with the value of N and the number of subsidiary regions. For example, when the number of subsidiary regions is changed from 32 to 64, the bit value [4:0] in eq. 1, eq. 2 and eq. 3 should be modified to be [5:0]. Such modification can be derived from the present disclosure by those of ordinary skill in the art.

Figure 9:
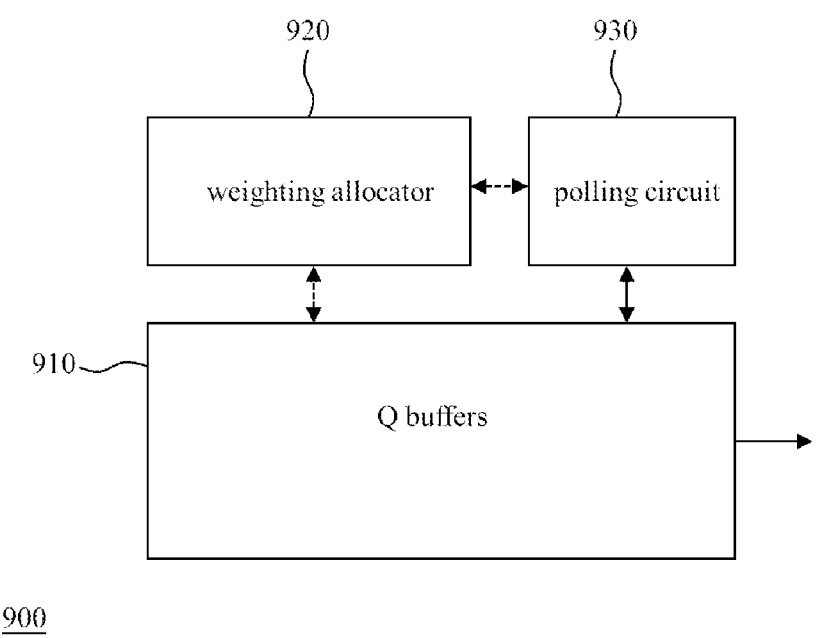
FIG. 9 illustrates another embodiment of the data output dispatching device of the present invention.

FIG. 9 illustrates another embodiment of the data output dispatching device of the present disclosure. In comparison with the embodiment of FIG. 2, the embodiment of FIG. 9 firstly distributes token(s) associated with the weighting W of each queue to W points of all queue points in accordance with at least one binary bit reverse sequence while the number of queue points could be equal to or less than the number of the allowable maximum weighting for preventing wasting time on dispatching time, and then polls each queue for data output according to the order of the queue points; the embodiment of FIG. 2 firstly defines a plurality of regions in connection with all of the queues according to the weightings of the queues, and then assigns a token to one of the queues when a binary bit reverse count value falls within the region in connection with this queue. As shown in FIG. 9, the data output dispatching device 900 includes: Q buffers 910; a weighting allocator 920; and a polling circuit 930. The Q buffers 910 are operable to store data of Q queues respectively (i.e., one of the Q buffers 910 stores data of one of the Q queues). The Q queues are associated with Q weightings respectively, and each of the Q weightings is not greater than a maximum weighting which is not greater than $2^N$ (while the maximum weighting is equal to $2^N-1$ in this embodiment), in which the Q is an integer greater than one and the N is a positive integer. The weighting allocator 920 is configured to allocate the Q weightings (i.e., to allocate the tokens associated with the Q weightings) according to at least one binary bit reverse sequence, so as to distribute a $K^{th}$ weighting among the Q weightings and make the $K^{th}$ weighting be logically associated with T queue point(s) of $2^N$ queue points, in which the K is a positive integer not greater than the Q, the T is an integer not less than zero and not greater than the maximum weighting, the value of the $K^{th}$ weighting is the T, and the order of the $2^N$ queue points is in incremental order. The polling circuit 930 is configured to poll the Q buffers according to at least a part of the order of the $2^N$ queue points (in consideration of that some queue point might be associated with none of the weightings and negligible), and when the polling circuit 930 polls the Q buffers 910 from a first buffer 910 to a $Q^{th}$ buffer 910 during a current polling cycle, the polling circuit 930 allows a buffer 910 of the Q buffers 910 in association with the $K^{th}$ weighting to obtain a token for data output if the current polling cycle is logically associated with one of the aforementioned T queue point(s) of the $2^N$ queue points.

Figure 10:
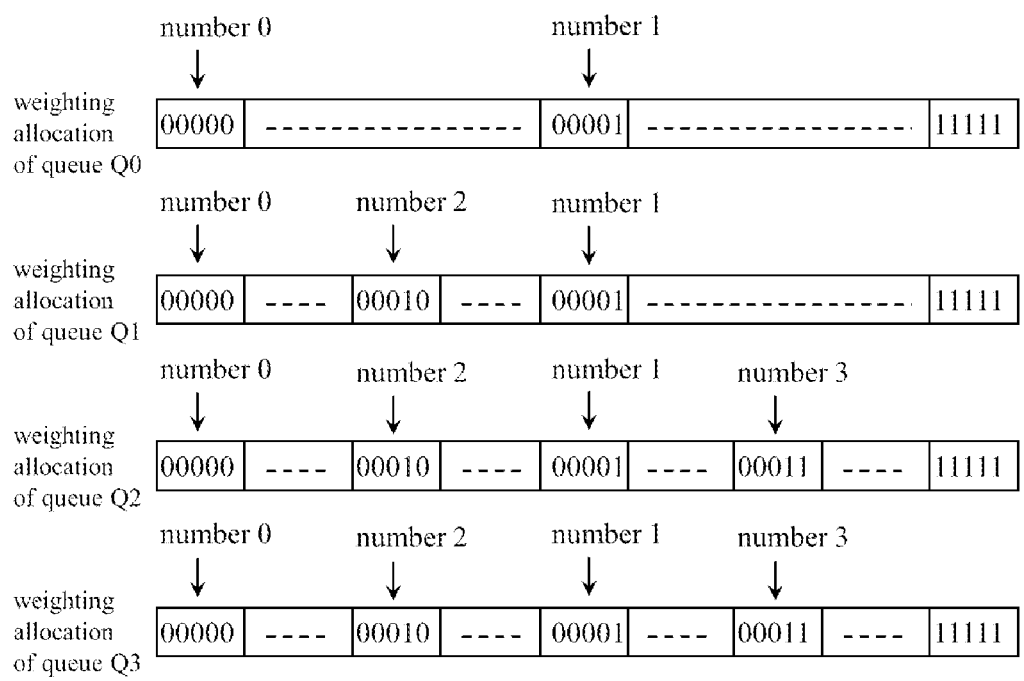
FIG. 10 illustrates how the weighting allocator of FIG. 9 allocates weightings in light of a binary bit reverse sequence.

Please refer to FIG. 10. If the aforementioned Q queues are queues Q0, Q1, Q2 and Q3 and the weightings of the queues Q0, Q1, Q2 and Q3 are 2, 3, 4, 4 in turn while each of the weightings is not greater than a maximum weighting 31 which is not greater than $2^N=2^5$, the weighting allocator 920 is configured to make two tokens (represented by number 0 and number 1 for understanding and description) associated with the weighting 2 of the queue Q0 be logically connected with the same number of a five-bit reverse sequence (which means that the number 0 of the tokens is associated with 00000 in the sequence and the number 1 of the tokens is associated with 00001 in the sequence), so as to distribute the weighting of the queue Q0 in accordance with the feature of number discontinuity of the reverse sequence. More specifically, the aforementioned $2^N$ queue points are 32 consecutive queue points, the first queue point is logically connected with the number 00000 in the reverse sequence, and the seventeenth queue point is logically connected with the number 00001 in the reverse sequence. Therefore, if the current polling cycle of the polling circuit 930 is logically associated with the first or the seventeenth queue point, the buffer 910 of the Q0 queue will gain a token. Similarly, the weighting allocator 920 is operable to logically connect three tokens (represented by number 0, number 1 and number 2 respectively) associated with the weighting 3 of the Q1 queue with the same number of a five-bit reverse sequence, so as to distribute the weighting of the queue Q1. The weightings of the other queues can be dispersed in the same way.

Figure 11:
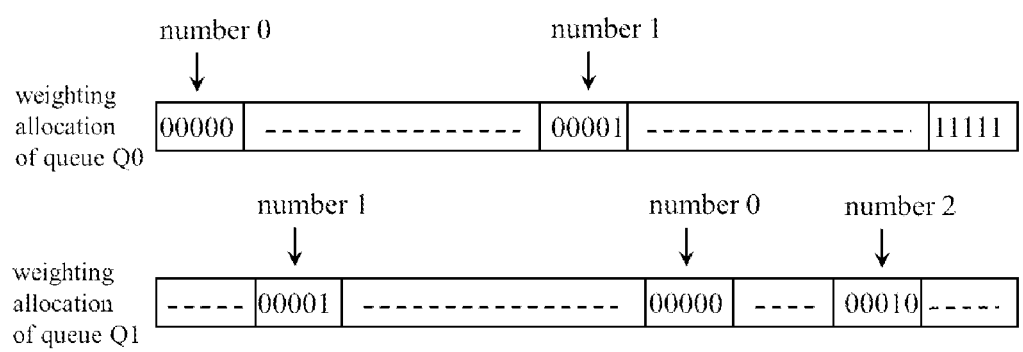
FIG. 11 illustrates how the weighting allocator of FIG. 9 allocates weightings in light of a binary bit reverse sequence.

As it is shown in FIG. 10, each of the weightings of the queues Q0, Q1, Q2 and Q3 is logically associated with 00000 and 00001 in a reverse sequence. Since the same numbers in the four reverse sequences are associated with the same queue points among the 32 queue points, the polling circuit 930 will output data of the queues Q0, Q1, Q2 and Q3 in turn within the same polling cycle, which leads to a problem of unstable data output. Therefore, when the weighting allocator 920 distributes token(s) of the weighting of each queue, the weighting allocator 920 is operable to make the sequence of one queue (e.g., queue Q1) be a shift version of the sequence of another queue (e.g., queue Q0) as shown in FIG. 11, and thereby prevent the problem of data burst or unstable data output. It should be noted that FIG. 11 can be read as: token(s) (represented by number 0, number 1, etc.) of one queue among two queues is/are associated with the same number(s) in a reverse sequence logically, while token(s) of the other queue is/are associated with "the same number(s) plus a shift number" in the reverse sequence.

Figure 12:
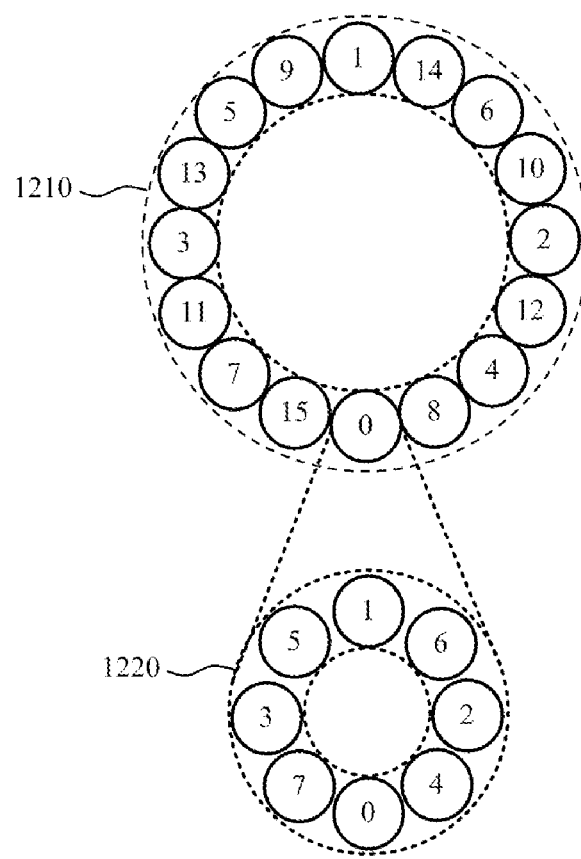
FIG. 12 illustrates how the weighting allocator of FIG. 9 allocates weightings by levels.

In order to prevent the data output dispatching device 900 wastes its time on a queue having no data left for output (while the weighting of this queue is greater than zero), the weighting allocator 920 may accelerate the operation of allocating weightings by classification. For instance, as it is shown in FIG. 12, the weighting of each queue (i.e., the tokens associated with the weighting) can be relatively uniformly distributed to $2^X$ big circles of a big round 1210 (while the X is a positive integer and the sixteen big circles in FIG. 12 represent sixteen values of a reverse sequence), the weighting given to each big circle is then relatively uniformly distributed to $2^{(N-X)}$ small circle(s) of a small round 1220 (while the eight small circles in FIG. 12 represent eight values of a reverse sequence), and the bottom one of the small circles included in the bottom big circle is the one being polled. If the small circle being polled is given a non-zero weighting, the queue in association with this small circle gains a token. If at least one of the bottom big circles of all big rounds 1210 is given a non-zero weighting and associated with a queue having data to be outputted, all the small rounds 1220 in association with these bottom big circles will be rotated for $2^{(N-X)}$ time(s) so as to ensure that each small circle with a non-zero weighting will be polled. When the rotation of the small rounds 1220 is done or the above-described terms of rotation is not fulfilled, the big rounds 1210 are rotated, so that a next cycle is started and the terms of rotation of the small rounds 1220 will be verified again for deciding whether the small circles should be polled. It should be noted that although only one big round 1210 and one small round 1220 are shown in FIG. 12, the number of all big rounds 1210 is equal to the number of all queues, and the number of all small rounds 1220 is equal to the number of the big rounds 1210 multiplied by the number of big circles in a big round 1210. In addition, all big rounds 1210 will be rotated simultaneously, and all small rounds will be rotated simultaneously.

Figure 13:
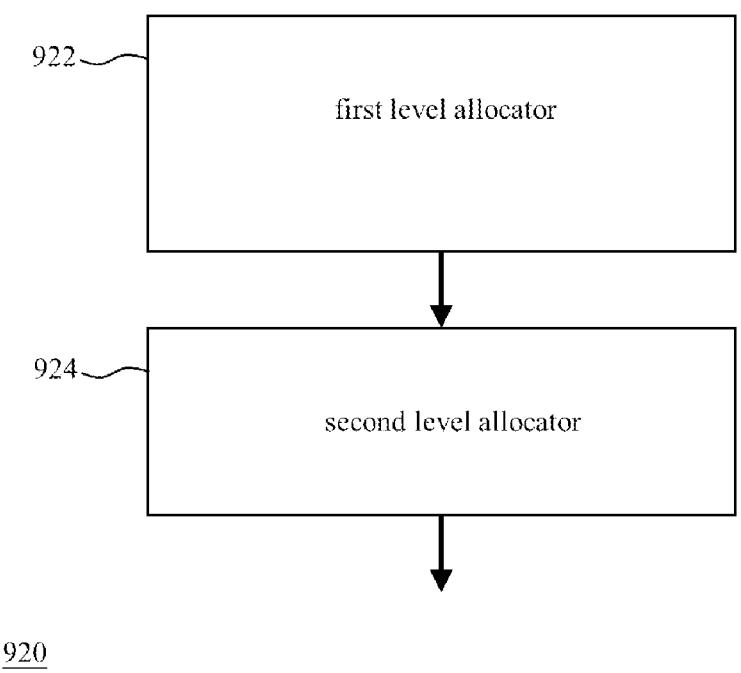
FIG. 13 illustrates an embodiment of the weighting allocator operable to execute the weighting allocation of FIG. 12.

On the basis of the above description, in order to implement the concept of classification of FIG. 12, the present disclosure discloses an embodiment of the weighting allocator 920 as shown in FIG. 13. The weighting allocator 920 of FIG. 13 includes: a first level allocator 922 and a second level allocator 924. The first level allocator 922 is configured to process each weighting of all queues with a first level allocation process according to the numerical size of the weighting under process, so as to logically associate the aforementioned $K^{th}$ weighting with R region(s) (which could be understood as the big circle(s) carrying one or more token(s) of a weighting in FIG. 12) of $2^X$ regions (i.e., the number of big circles in the big round 1210 in FIG. 12), in which the $2^X$ regions are logically associated with the aforementioned $2^N$ queue points (i.e., the $2^N$ queue points (e.g., $2^7$=128 queue points) are logically and uniformly distributed to $2^X$ regions (e.g., $2^4$=16 regions)), each of the $2^X$ regions is associated with a round weighting while each of the $2^X$ round weightings is not greater than the value of the $K^{th}$ weighting (i.e., the aforementioned T), the sum of round weighting(s) associated with the R region(s) is equal to the T, the X is a positive integer less than the N, the R is equal to $2^X$ if the T is not less than $2^X$ (i.e., the value of the $K^{th}$ weighting is greater than or equal to the number of circles in the big round 1210 in FIG. 12), and the R is equal to the T if the T is less than $2^X$ (i.e., the value of the $K^{th}$ weighting is less than the number of circles in the big round 1210 in FIG. 12). The second level allocator 924 is configured to process each of the $2^X$ round weightings derived from the weightings of all queues with a second level allocation process, so as to logically associate an $S^{th}$ round weighting (i.e., the token(s) of the weighting under process assigned to a big circle in FIG. 12) among the R round weighting(s) with Y queue point(s) (which could be understood as the small circles carrying one or more token(s) of a weighting in FIG. 12) of $2^{(N-X)}$ queue points (i.e., the number of small circles in the small round 1220 in FIG. 12), in which the Y queue point(s) pertain(s) to the T queue point(s), the S is an integer not less than zero and not greater than the R, and the Y is equal to the $S^{th}$ round weighting. In this embodiment, since the weighting allocator 920 allocates token(s) of a weighting in accordance with a binary bit reverse sequence, the difference between any two round weightings will be not greater than one; additionally, (N−X) could be less than X, so that the processing cycle (which can be read as the number of small circles in the small round 1220 in FIG. 12) of the second level allocation process is shorter than the processing cycle (which can be read as the number of big circles in the big round 1210 in FIG. 12) of the first level allocation process, and therefore the processing cycle of the second level allocation process will not be too long.

Figure 14:
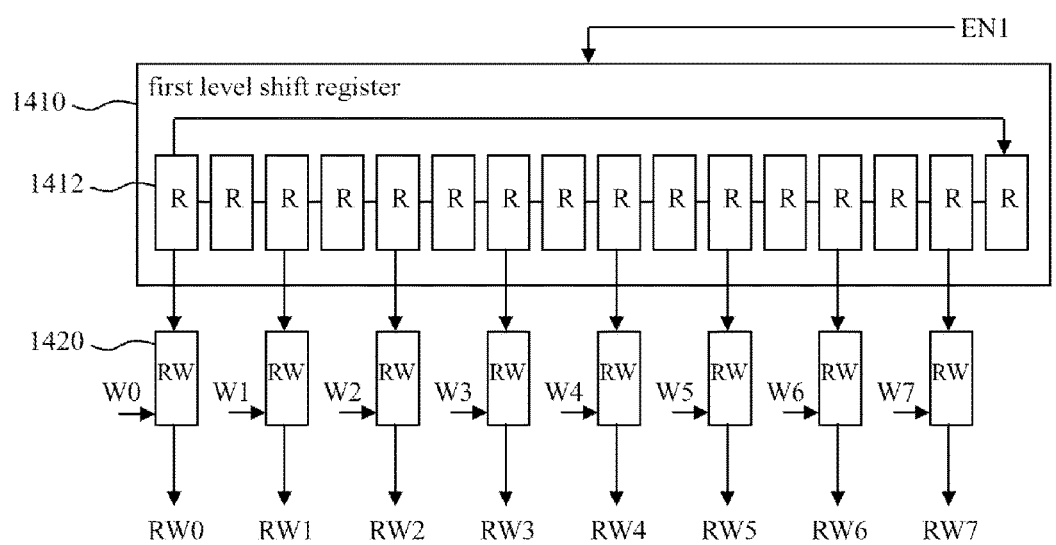
FIG. 14 illustrates an embodiment of the first level allocator of FIG. 13.
Figure 15:
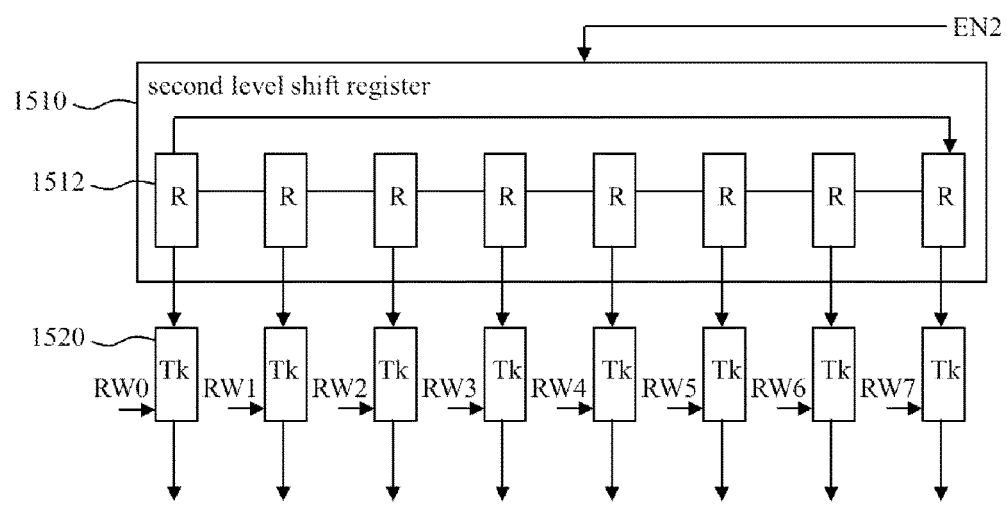
FIG. 15 illustrates an embodiment of the second level allocator of FIG. 13.

FIG. 14 and FIG. 15 illustrate an embodiment of the first level allocator 922 and an embodiment of the second level allocator 924 respectively. For better understanding, the embodiments of FIGS. 14 and 15 adopt the setting of Q=8, N=7 (which implies that the maximum weighting is not greater than $2^N$=128), and X=4; of course the setting could be modified in practice. Besides, in order to prevent readers from confusion caused by too many labels, some repeated labels are omitted in FIGS. 14 and 15. As it is shown in FIG. 14, the first level allocator 922 includes: a first level shift register 1410; and Q round weighting output units 1420. The first level shift register 1410 (i.e., the big round 1210 in FIG. 12) includes $2^X$ shift register units 1412 (which are labeled with "R" while the shift registered value(s) of these units 1412 can be understood as the big circles in FIG. 12 and each of the units 1412 is a circuit, e.g., X flip-flops connected in parallel, operable to store a value of at least X bit(s)) configured to store and shift a first level binary bit reverse sequence (e.g., a sequence 0000, 1000, 0100, . . . , 0111 and 1111) according to a first shift enablement signal (i.e., EN1 in the figure), wherein the shift operation can be read as the rotation of the big round 1210 in FIG. 12. The Q round weighting output units 1420 (which are labeled with "RW") are coupled with the first level shift register 1410 and configured to respectively output Q round weightings (i.e., RW0, RW1, . . . , RW6 and RW7 in the figure) according to the first level binary bit reverse sequence and the Q weightings (i.e., W0, W1, . . . , W6 and W7 in the figure) during a token output cycle. The Q round weighting output units 1420 are respectively coupled to different shift register units 1412 for realizing the shift operation as shown in FIG. 11. Each round weighting output unit 1420 is associated with a queue, and outputs a round weighting obtained by adding up a comparison value and the value of the most significant (N−X) bit(s) (e.g., 111 of a binary system=7 of a decimal system) of the weighting (e.g., 1111100 of a binary system=124 of a decimal system) pertaining to the same queue; and if the value of the least significant X bit(s) (e.g., 1100 of a binary system=12 of a decimal system) of the weighting (e.g., 1111100 of a binary system=124 of a decimal system) is greater than the value (e.g., one among decimal numbers 0 to 15) of the shift register unit 1412 currently received by the round weighting output unit 1420, the aforementioned comparison value is one, or else is zero. For example, providing that the weighting of a queue is decimal number 124 (i.e., binary number 1111100), the value of the least significant X bits (i.e., 1100 in this example) is decimal number 12 and the value of the most significant (N−X) bits (i.e., 111 in this example) is decimal number 7, when the value 12 of the least significant X bits is greater than the decimal value 8 (i.e., the binary value 1000) from the shift register unit 1412, the comparison value is one and the round weighting obtained by adding up the comparison value "1" and the value "7" of the most significant (N−X) bit(s) is 8 (i.e., 1+7=8); on the other hand, when the value 12 of the least significant X bits is not greater than the decimal value 12 (i.e., the binary value 1100) from the shift register unit 1412, the comparison value is zero and the round weighting obtained by adding up the comparison value "0" and the value "7" of the most significant (N−X) bit(s) is 7 (i.e., 0+7=7); as a result, the weighting 124 is relatively uniformly distributed to $2^X=2^4$=16 regions while the round weighting of each region is either 8 or 7. It should be noted that a person who carries out the present invention may set the comparison value by a known or a self-developed rule providing the sum of round weighting(s) from a round weighting output unit 1420 is equal to the weighting of the queue in association with this round weighting output unit 1420.

As it shown in FIG. 15, the second level allocator 924 includes: a second level shift register 1510; and Q token-indication output units 1520 (labeled with "Tk" in the figure). The second level shift register 1510 includes $2^{(N-X)}$ shift register units 1512 (which are labeled with "R" in the figure while the shift registered value of these units 1512 could be understood as the small circles in FIG. 12 and each of the units 1512 is a circuit, e.g., (N−X) flip-flop(s) connected in parallel, operable to store a value of at least (N−X) bit(s)) configured to store and shift a second level binary bit reverse sequence (e.g., a sequence 000, 100, 010, . . . , 011 and 111) according to a second shift enablement signal (i.e., EN2 in the figure), wherein the shift operation here can be read as the rotation of the small round 1220 in FIG. 12. The Q token-indication output units 1520 are configured to generate Q token indications according to the second level binary bit reverse sequence and the Q round weightings (i.e., RW0, RW1, . . . , RW6 and RW7 in the figure) during the aforementioned token output cycle, in which each of the Q token indications is used for notifying the polling circuit 930 whether a buffer 910 of the Q buffers in association with the same token indication gains a token for data output. The above-described Q token-indication output units 1520 respectively receive round weightings from the Q round weighting output units 1420, and in this embodiment, if a token-indication output unit 1520 receives a round weighting greater than the value (e.g., one among the decimal numbers 0 to 7, i.e., one among the binary numbers 000 to 111 of the second level binary bit reverse sequence) received by the same token-indication output unit 1520, this token-indication output unit 1520 generates a token indication to ask for a token, or else asks for no token. It should be noted that a person carrying out the present invention may associate the round weighting received by a token-indication output unit 1520 with the registered value from the second shift register 1510 in a known or a self-developed rule. For instance, if the number of round weighting(s) is Z, the maximum Z registered value(s) among all registered values of the second level shift register 1510 will be associated with the Z round weighting(s), in which the token indication(s) related to these associated registered value(s) will ask for token(s).

Please refer to FIGS. 14 and 15 again. When any of the Q round weightings is not zero and the buffer 910 associated with the non-zero round weighting stores data, the second level shift register 1510 shifts the second level binary bit reverse sequence according to the aforementioned second shift enablement signal (while this can be read as the terms of rotation of the small round 1220 in FIG. 12); and when the second level shift register 1510 shifts the second level binary bit reverse sequence for $2^{(N-X)}$ time(s) (while this can be read as the small round 1220 in FIG. 12 has rotated once) or stops shifting the second level binary bit reverse sequence (while this can be read as the terms of rotation of the small round 1220 in FIG. 12 being unsatisfied), the first level shift register 1410 shifts the first level binary bit reverse sequence according to the aforementioned first shift enablement signal (and this can be read as the terms of rotation of the big round 1210 in FIG. 12). It should be noted that the first and second shift enablement signals can be generated by a shift control register (not shown in the figures) in light of the above-described terms of shift operation.

Figure 16:
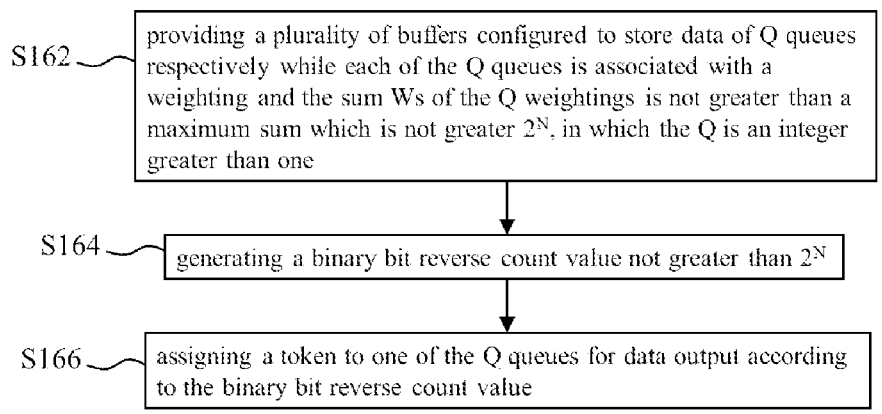
FIG. 16 illustrates an embodiment of the data output dispatching method of the present invention.

In addition to the aforementioned data output dispatching device, the present disclosure also discloses a data output dispatching method which can be carried out by the data output dispatching device of the present disclosure or the equivalent thereof. An embodiment of the method is shown in FIG. 16, including the following steps:

Step S162: providing a plurality of buffers configured to store data of Q queues respectively while each of the Q queues is associated with a weighting and the sum Ws of the Q weightings is between $2^{(M-1)}$ and $2^M$ and not greater than a maximum sum which is not greater $2^N$, in which the Q is an integer greater than one, the M is a positive integer, and the N is an integer not less than the M. This step can be carried out by the buffers 210 of FIG. 2 or the equivalent thereof.

Step S164: generating a binary bit reverse count value not greater than $2^N$. This step can be carried out by the binary bit reverse counter 220 of FIG. 2 or the equivalent thereof.

Step S166: assigning a token to one of the Q queues for data output according to the binary bit reverse count value. This step can be carried out by the control circuit 230 of FIG. 2 or the equivalent thereof.

Figure 17:
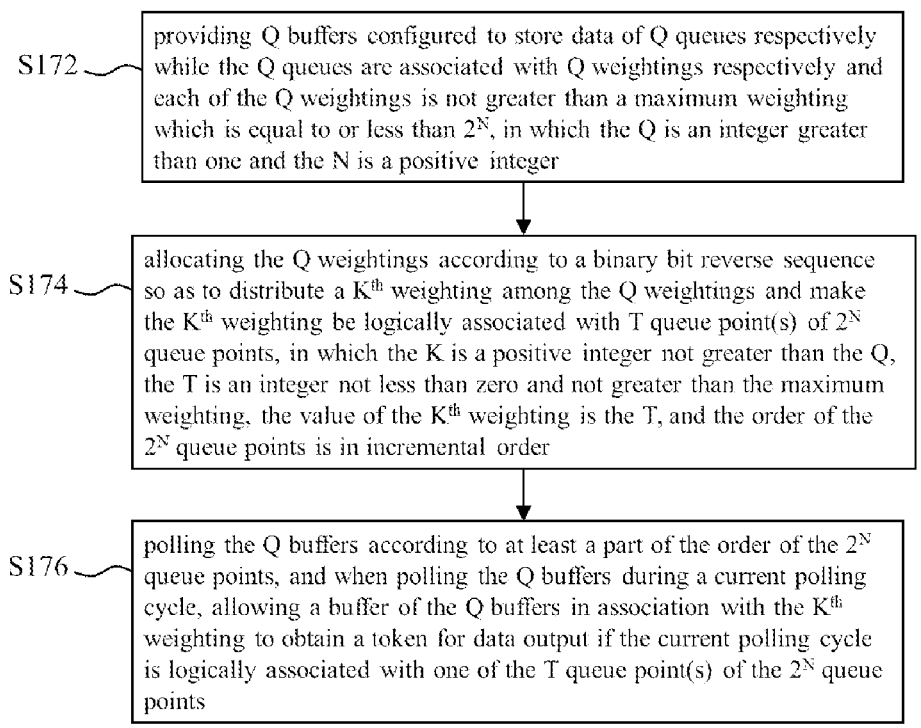
FIG. 17 illustrates another embodiment of the data output dispatching method of the present invention.

Another embodiment of the said data output dispatching method is shown in FIG. 17, including the following steps:

Step S172: providing Q buffers configured to store data of Q queues respectively while the Q queues are associated with Q weightings respectively and each of the Q weightings is not greater than a maximum weighting which is equal to or less than $2^N$, in which the Q is an integer greater than one and the N is a positive integer. This step can be carried out by the buffers 910 of FIG. 9 or the equivalent thereof.

Step S174: allocating the Q weightings according to a binary bit reverse sequence so as to distribute a $K^{th}$ weighting among the Q weightings and make the $K^{th}$ weighting be logically associated with T queue point(s) of $2^N$ queue points, in which the K is a positive integer not greater than the Q, the T is an integer not less than zero and not greater than the maximum weighting, the value of the $K^{th}$ weighting is the T, and the order of the $2^N$ queue points is in incremental order. This step can be carried out by the weighting allocator 920 of FIG. 9 or the equivalent thereof.

Step S176: polling the Q buffers according to at least a part of the order of the $2^N$ queue points, and when polling the Q buffers during a current polling cycle, allowing a buffer of the Q buffers in association with the $K^{th}$ weighting to obtain a token for data output if the current polling cycle is logically associated with one of the T queue point(s) of the $2^N$ queue points. This step can be carried out by the polling circuit 930 of FIG. 9 or the equivalent thereof.

Since those of ordinary skill in the art can appreciate the detail and modification of the method embodiments by referring to the explanation of all the device embodiments, which means that each feature of the device embodiments can be applied to the method embodiments in an reasonable way, therefore repeated and redundant description is omitted.

In summary, the data output dispatching device and method of the present disclosure are capable of reducing the probability of packets from the same queue being transmitted sequentially and accelerating the speed of dispatching data by pass/omitting/neglecting a queue with no data to be outputted, and thus can significantly improve the efficiency of dispatching data for output.

The aforementioned descriptions represent merely the exemplary embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A data output dispatching device configured to reduce a probability that packets from a same queue are transmitted sequentially, the data output dispatching device comprising:
   Q buffers configured to store data of Q queues respectively while the Q queues are associated with Q weightings respectively and each of the Q weightings is not greater than a maximum weighting which is equal to or less than $2^N$, in which the Q is an integer greater than one and the N is a positive integer;
   a weighting allocator configured to allocate the Q weightings according to a binary bit reverse sequence so as to distribute a $K^{th}$ weighting among the Q weightings and make the $K^{th}$ weighting be logically associated with T queue point(s) of $2^N$ queue points, in which the K is a positive integer not greater than the Q, the T is an integer not less than zero and not greater than the maximum weighting, the value of the $K^{th}$ weighting is the T, and an order of the $2^N$ queue points is in incremental order; and
   a polling circuit configured to poll the Q buffers according to at least a part of the order of the $2^N$ queue points, and when the polling circuit polls the Q buffers during a current polling cycle, the polling circuit allows a buffer of the Q buffers in association with the $K^{th}$ weighting to obtain a token for data output if the current polling cycle is logically associated with one of the T queue point(s) of the $2^N$ queue points.

2. The data output dispatching device of claim 1, wherein the weighting allocator logically associates integer(s), which is/are less than the $K^{th}$ weighting and not less than zero, with corresponding number(s) of a $K^{th}$ binary bit reverse sequence to thereby distribute the $K^{th}$ weighting.

3. The data output dispatching device of claim 2, wherein when the weighting allocator distributes a $(K+1)^{th}$ weighting among the Q weightings, the weighting allocator logically associates integer(s), which is/are less than the $(K+1)^{th}$ weighting and not less than zero, with corresponding number(s) of a $(K+1)^{th}$ binary bit reverse sequence which is a shift version of the $K^{th}$ binary bit reverse sequence.

4. The data output dispatching device of claim 1, wherein the weighting allocator includes:
   a first level allocator configured to process each of the Q weightings with a first level allocation process so as to logically associate the $K^{th}$ weighting with R region(s) of $2^X$ regions, in which the $2^X$ regions are logically associated with the $2^N$ queue points, the $2^X$ regions are in association with $2^X$ round weightings respectively while each of the $2^X$ round weightings is not greater than the T, the sum of R round weighting(s) associated with the R region(s) is equal to the T, the X is a positive integer less than the N, the R is equal to $2^X$ if the T is not less than $2^X$, and the R is equal to the T if the T is less than $2^X$; and
   a second level allocator configured to process each of the $2^X$ round weightings derived from the Q weightings with a second level allocation process so as to logically associate an $S^{th}$ round weighting among the R round weighting(s) with Y queue point(s) of $2^{(N-X)}$ queue points, in which the Y queue point(s) pertain(s) to the T queue point(s), the S is an integer not less than zero and not greater than the R, and the Y is equal to the $S^{th}$ round weighting.

5. The data output dispatching device of claim 4, wherein the difference between any two of the $2^X$ round weightings is not greater than one.

6. The data output dispatching device of claim 4, wherein the first level allocator includes:
   a first level shift register including $2^X$ shift register units configured to store and shift a first level binary bit reverse sequence; and
   Q round weighting output units coupled with the first level shift register and configured to respectively output Q round weightings of the $2^X$ round weightings according to the first level binary bit reverse sequence and the Q weightings during a token output cycle.

7. The data output dispatching device of claim 6, wherein the second level allocator includes:
   a second level shift register including $2^{(N-X)}$ shift register units configured to store and shift a second level binary bit reverse sequence; and
   Q token-indication output units configured to generate Q token indications according to the second level binary bit reverse sequence and the Q round weightings during the token output cycle, in which a first token indication of the Q token indications is used for notifying the polling circuit whether a first buffer of the Q buffers in association with the first token indication obtains the token for data output.

8. The data output dispatching device of claim 7, wherein when the second level shift register shifts the second level binary bit reverse sequence for $2^{(N-X)}$ times or stops shifting the second level binary bit reverse sequence, the first level shift register shifts the first level binary bit reverse sequence.

9. A data output dispatching method configured to reduce a probability that packets from a same queue are transmitted sequentially, the data output dispatching method comprising the following steps:
   providing a plurality of buffers configured to store data of Q queues respectively while the Q queues are associated with Q weightings respectively and a sum Ws of the Q weightings is between $2^{(M-1)}$ and $2^M$ and not greater than a maximum sum which is not greater $2^N$, in which the Q is an integer greater than one, the M is a positive integer, and the N is an integer not less than the M;
   generating a binary bit reverse count value not greater than $2^N$; and
   assigning a token to one of the Q queues for data output according to the binary bit reverse count value.

10. The data output dispatching method of claim 9, wherein a $K^{th}$ queue and a $(K+1)^{th}$ queue among the Q queues are respectively associated with a $K^{th}$ weighting and a $(K+1)^{th}$ weighting, the $K^{th}$ weighting and the $(K+1)^{th}$ weighting define a $(K+1)^{th}$ region, and the step of assigning the token includes: when the binary bit reverse count value falls within the $(K+1)^{th}$ region, assigning the token to the $(K+1)^{th}$ queue of the Q queues.

11. The data output dispatching method of claim 10, wherein when the K is equal to one, a number zero and the $K^{th}$ weighting define a first region, and the step of assigning the token includes: when the binary bit reverse count value falls within the first region, assigning the token to the $K^{th}$ queue of the Q queues.

12. The data output dispatching method of claim 9, wherein the step of generating the binary bit reverse count value includes:
   storing a counting value according to an addition value and forward storage order, and outputting the counting value;
   adding up the counting value and a predetermined number to generate the addition value; and
   storing the addition value according to reverse storage order, and outputting the addition value as the binary bit reverse count value.

13. The data output dispatching method of claim 12, wherein the predetermined number is a first shift number to make the binary bit reverse count value not greater than $2^M$, or the predetermined number is one.

14. The data output dispatching method of claim 13, wherein when the predetermined number is one, the sum Ws is constant and equal to the maximum sum.

15. The data output dispatching method of claim 9, wherein the step of generating the binary bit reverse count value includes:
   storing a counting value according to an addition value and forward storage order, and outputting the counting value;
   adding up the counting value and a first shift number to generate a first addition value;
   adding up the counting value and a second shift number to generate a second addition value;
   determining whether a bit reverse value of the first addition value is less than the sum Ws, and then generating a decision result;
   outputting one of the first and second addition values as the addition value according to the decision result; and storing the addition value according to reverse storage order, and outputting the addition value as the binary bit reverse count value, wherein the binary bit reverse count value is not greater than the sum Ws.

16. The data output dispatching method of claim 9, wherein the step of generating the binary bit reverse count value includes:

storing a counting value according to an addition value and forward storage order, and outputting the counting value;

adding up the counting value and a first shift number to generate a first addition value;

adding up the counting value and a constant number to generate a second addition value;

generating a decision result according to a predetermined condition;

outputting one of the first and second addition values as the addition value according to the decision result; and storing the addition value according to reverse storage order, and outputting the addition value as the binary bit reverse count value, wherein the binary bit reverse count value is not greater than $2^M$.

17. The data output dispatching method of claim 16, wherein the predetermined condition includes a real-time condition of the Q queues stored in the buffers.

18. A data output dispatching device configured to reduce a probability that packets from a same queue are transmitted sequentially, the data output dispatching device comprising:

Q buffers configured to store data of Q queues respectively while the Q queues are associated with Q weightings respectively, in which the Q is an integer greater than one;

a binary bit reverse sequence generating circuit configured to provide a binary bit reverse sequence; and a control circuit configured to assign a token to one of the Q queues for data output according to the binary bit reverse sequence.

19. The data output dispatching device of claim 18, wherein the binary bit reverse sequence generating circuit is included in a weighting allocator configured to allocate the Q weightings according to the binary bit reverse sequence, and the control circuit is a polling circuit configured to poll the Q buffers.

20. The data output dispatching device of claim 18, wherein the binary bit reverse sequence generating circuit is included in a binary bit reverse counter configured to generate a binary bit reverse count value in accordance with the binary bit reverse sequence, and the control circuit is configured to assign the token according to the binary bit reverse count value.

* * * * *